(12) United States Patent
Wegman (10) Patent No.: US 7,841,124 B2
(45) Date of Patent: Nov. 30, 2010

(54) ROD HOLDER

(75) Inventor: Charles Wegman, Greensboro, NC (US)

(73) Assignee: C.E. Smith Co., Inc., Greensboro, NC (US)

( * ) Notice: Subject to any disclaimer, the term of this patent is extended or adjusted under 35 U.S.C. 154(b) by 0 days.

(21) Appl. No.: 11/972,038

(22) Filed: Jan. 10, 2008

(65) Prior Publication Data

US 2008/0155882 A1    Jul. 3, 2008

Related U.S. Application Data

(63) Continuation-in-part of application No. 10/137,786, filed on May 2, 2002, now Pat. No. 7,331,138.

(51) Int. Cl.
*A01K 97/10* (2006.01)
(52) U.S. Cl. ...................................... 43/21.2
(58) Field of Classification Search ............... 43/21.2; 248/513, 515, 535; D22/147
See application file for complete search history.

(56) References Cited

U.S. PATENT DOCUMENTS

| | | | | | |
|---|---|---|---|---|---|
| 259,142 | A | * | 6/1882 | Hart | 248/513 |
| 1,053,255 | A | | 2/1913 | Ward | 248/536 |
| 2,314,747 | A | * | 3/1943 | White | 43/21.2 |
| 2,698,725 | A | * | 1/1955 | Triplett | 248/511 |
| 2,828,096 | A | * | 3/1958 | Beri | 43/21.2 |
| 3,063,668 | A | * | 11/1962 | Yohe | 248/538 |
| 3,161,390 | A | * | 12/1964 | Larson | 248/514 |
| 3,246,865 | A | * | 4/1966 | Latimer | 248/515 |
| 3,484,066 | A | * | 12/1969 | Aunspaugh | 248/541 |
| 3,513,615 | A | * | 5/1970 | Berry | 52/633 |
| 3,598,129 | A | | 8/1971 | Itoda | 248/534 |
| 3,684,189 | A | | 8/1972 | Reed et al. | 239/425.5 |
| 3,903,634 | A | * | 9/1975 | Miyamae | 43/21.2 |
| 4,007,902 | A | | 2/1977 | Pettee | 248/534 |
| 4,062,299 | A | | 12/1977 | Smith | 108/42 |
| 4,257,181 | A | | 3/1981 | Cooper | 43/21.2 |
| 4,375,731 | A | | 3/1983 | Budd | 43/21.2 |
| 4,778,141 | A | | 10/1988 | Boger | 248/538 |
| D298,604 | S | * | 11/1988 | Newton | D8/380 |
| 4,871,099 | A | | 10/1989 | Bogar, Jr. | 224/566 |
| 4,887,375 | A | | 12/1989 | Shedd et al. | 43/21.2 |
| 4,901,970 | A | * | 2/1990 | Moss et al. | 248/514 |
| 4,953,318 | A | | 9/1990 | Vasseur | 43/21.2 |
| 4,964,233 | A | | 10/1990 | Benson et al. | 43/17 |
| 5,044,597 | A | | 9/1991 | Walczak | 248/530 |
| 5,054,229 | A | * | 10/1991 | Hughes | 43/21.2 |
| 5,070,638 | A | | 12/1991 | Tregaskis | 43/15 |

(Continued)

OTHER PUBLICATIONS

Photocopy of p. 94 from Melton International Catalog showing rod holders; 2000.

(Continued)

*Primary Examiner*—Son T Nguyen
*Assistant Examiner*—Shadi Baniani
(74) *Attorney, Agent, or Firm*—MacCord Mason PLLC (57) ABSTRACT

A rod holder having a multidirectional mounting feature. The rod holder includes a tube sized to receive a fishing rod. A multi-directional mounting feature is attached to the tube. The multi-directional mounting feature includes a plate defining at least two intersecting mounting channels. A cap is configured to mate with the plate in at least two positions, thereby allowing the rod holder to be multi-directionally mounted.

15 Claims, 7 Drawing Sheets

U.S. PATENT DOCUMENTS

| | | | | |
|---|---|---|---|---|
| 5,165,197 | A | 11/1992 | Sitton | 43/44.82 |
| 5,210,971 | A | 5/1993 | Efantis | 43/21.25 |
| 5,261,561 | A | 11/1993 | Hodges, Jr. | 220/735 |
| 5,457,918 | A | 10/1995 | Plourde | 52/165 |
| 5,515,656 | A | 5/1996 | Mihalich | 52/155 |
| 5,588,630 | A * | 12/1996 | Chen-Chao | 248/514 |
| D396,403 | S * | 7/1998 | Whittaker | D8/354 |
| 5,871,196 | A * | 2/1999 | Martelli | 248/514 |
| 5,915,942 | A | 6/1999 | Ratliffe | 43/21.2 |
| 6,289,627 | B1 | 9/2001 | Gibbs et al. | 43/21.2 |
| D476,716 | S | 7/2003 | Wegman | D22/147 |
| 6,591,541 | B1 * | 7/2003 | Cummings | 43/21.2 |
| 7,150,578 | B2 * | 12/2006 | Porco | 403/60 |
| 7,232,099 | B1 * | 6/2007 | Wilcox | 248/228.1 |
| 7,309,054 | B2 * | 12/2007 | Slatter et al. | 248/521 |

OTHER PUBLICATIONS

Photocopy of p. 144 from Overton's Catalog showing rod holders; 2001.

Photocopy of pp. 277 and 278 from Boater's World Catalog showing rod holders; 2001.

* cited by examiner

ROD HOLDER

CROSS REFERENCE TO RELATED APPLICATION

This application is a continuation-in-part of application Ser. No. 10/137,786 filed May 2, 2002, the entire contents of which is hereby incorporated by reference, now U.S. Pat. No. 7,331,138, issued Feb. 19, 2008.

BACKGROUND OF THE INVENTION (1) Field of the Invention

The present invention relates generally to a rod holder and, more particularly, to a rod holder including a multidirectional mounting feature.

(2) Description of the Related Art

Figure 1:
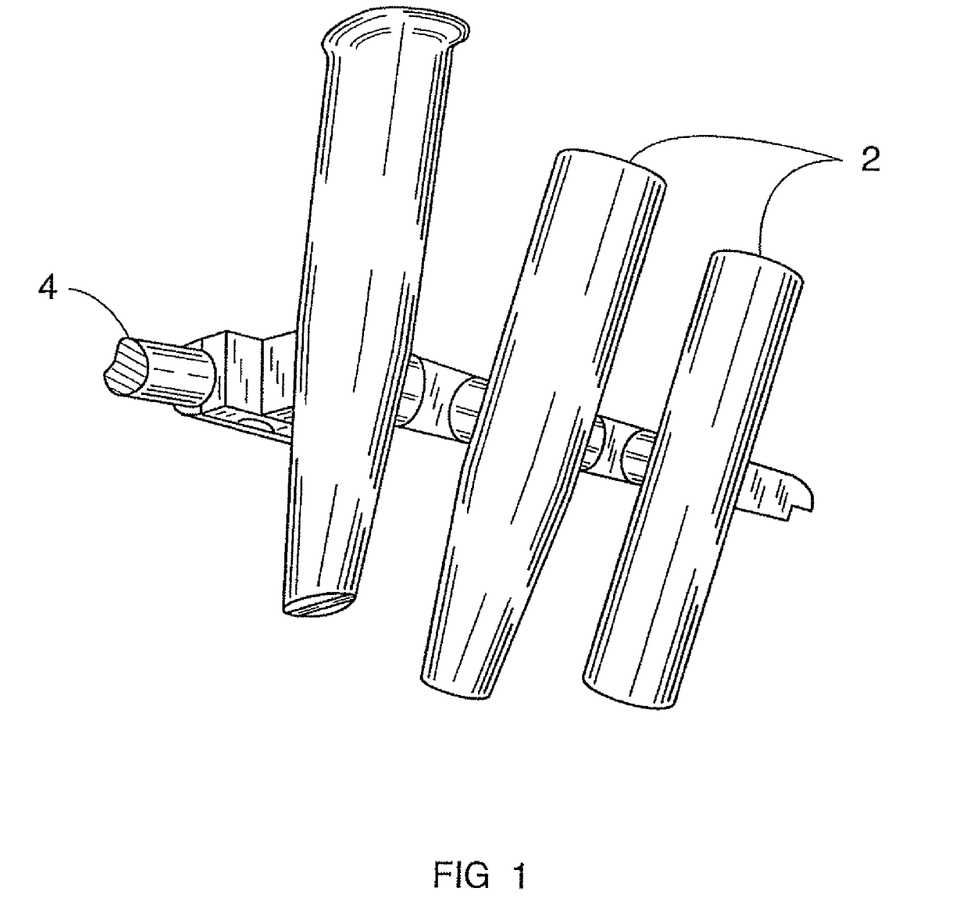
FIG. 1 shows a perspective view of two traditional rod holders mounted on a substantially horizontal tube.
Figure 2:
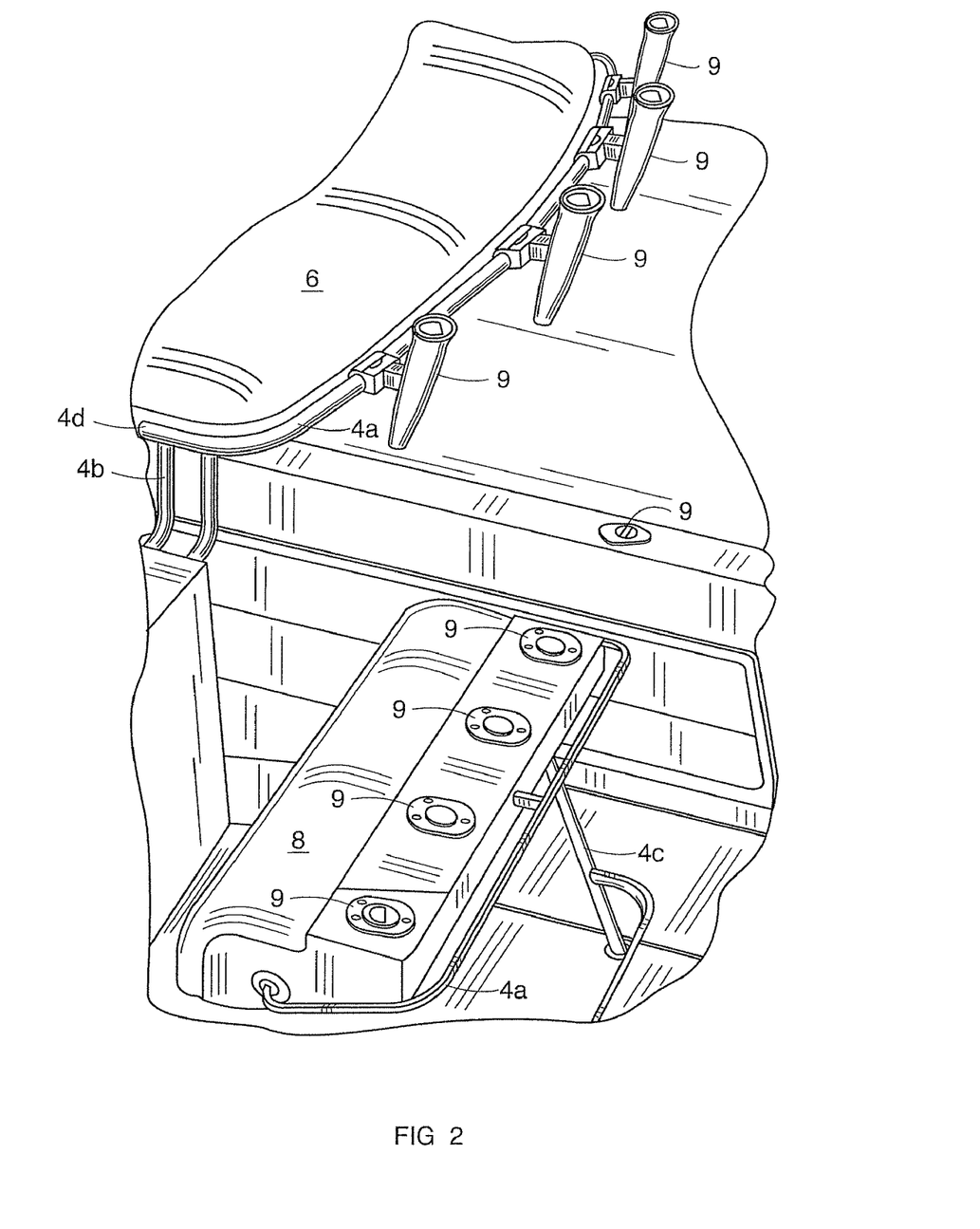
FIG. 2 is a perspective view of a boat cockpit showing various tubular rails and frames.

On fishing boats, rod holders are often used to store fishing rods or to hold fishing rods in use, for example, when trolling or bottom fishing. Mountable rod holders capable of mounting to portions of a boat are one type of rod holder known in the art. FIG. 1, shows an example of traditional mountable rod holders 2 mounted on a substantially horizontal tube 4. Tube 4 may be, for example, the substantially horizontal tube 4a of t-top 6 or seat 8 as shown in the boat of FIG. 2. As will be appreciated, substantially horizontal tubes can be oriented in various directions, for example, lengthwise (e.g., bow to stern as shown by tube 4d) or widthwise (e.g., port to starboard as shown by tube 4a). As also seen in FIG. 2, boats often have substantially vertical tubes, e.g., tube 4b or 4c. Traditional mountable rod holders were typically designed to mount to either substantially horizontal tubes oriented in a single direction or substantially vertical tubes, but not both.

It is to this problem, among others, that the present disclosure is directed.

SUMMARY OF THE INVENTION

The present application is directed to a rod holder having a multi-directional mounting feature. The parent case, from which this application stems, referred to the multi-directional mounting feature as a mounting feature that is a clamp with a multi-directional alignment feature, but in the interests of flow and clarity, the present application refers to this feature simply as a multi-directional mounting feature (or MDMF). The MDMF allows a single rod holder to be securely and stably mounted to tubes oriented in at least two different directions, e.g., tubes oriented vertically or horizontally, or tubes oriented horizontally lengthwise or horizontally widthwise.

By way of summary, in one embodiment, the rod holder comprises a tube sized to receive a fishing rod. The tube has a first end and a second end, and is open at its first end. A MDMF is attached to the tube of the rod holder. The MDMF includes a plate that defines at least two intersecting mounting channels. A cap is configured to mate with the plate in at least two different positions that correspond to the mounting channels, thereby allowing for multi-directional mounting to a variety of tubes (e.g., various rails or frames) located on a boat.

The above summary was intended to summarize certain embodiments of the present invention. Rod holders of the present invention will be set forth in more detail, in the figures and detailed description below. It will be apparent, however, that the detailed description is not intended to limit the present invention, the scope of which should be properly determined by the appended claims.

DETAILED DESCRIPTION OF PREFERRED EMBODIMENTS

Figure 3:
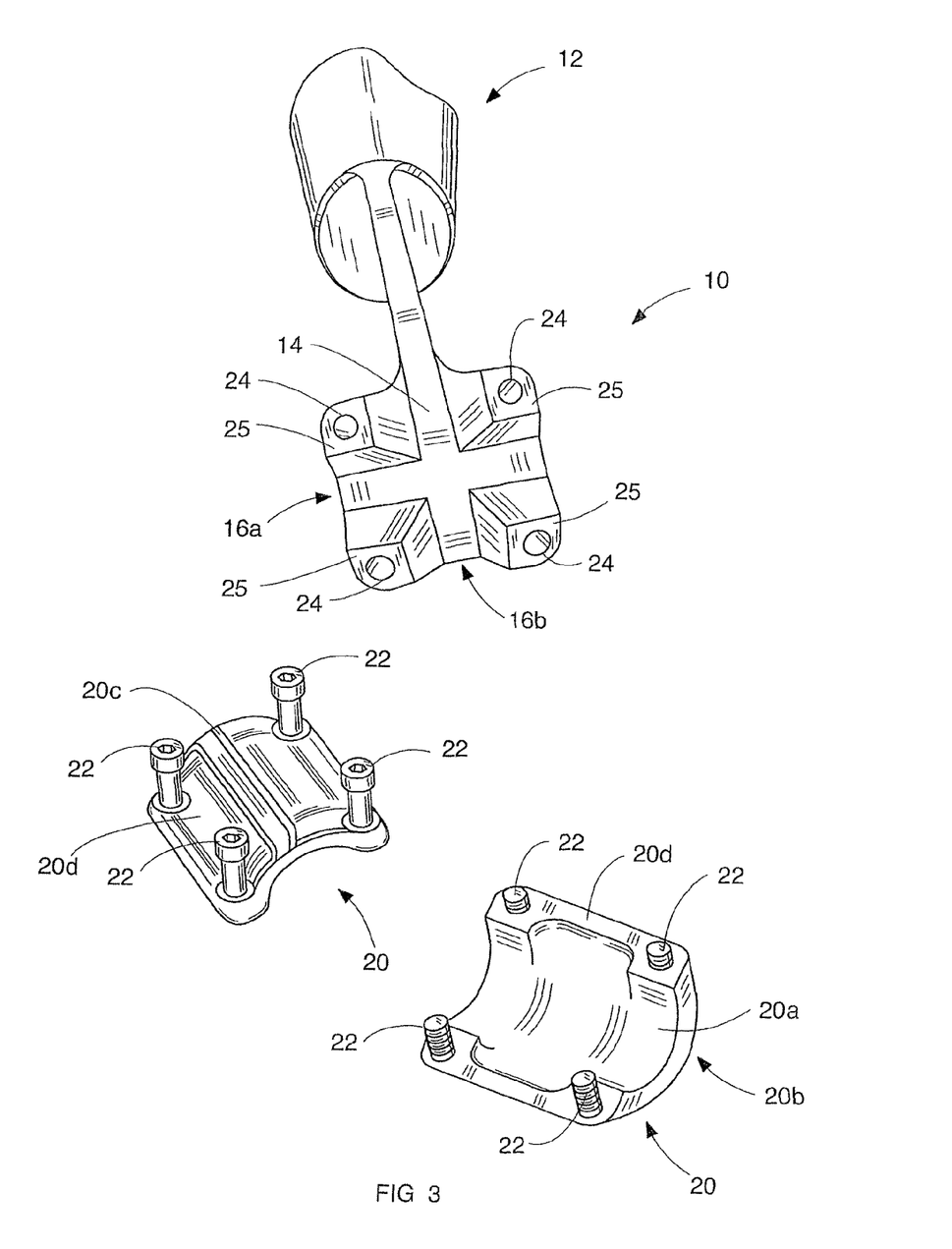
FIG. 3 is a perspective view of one embodiment of a multi-directional mounting feature constructed according to the present inventions.

FIG. 3 shows a close-up perspective view of one embodiment of a multi-directional mounting feature (hereinafter "MDMF") 10 of rod holder 12. MDMF 10 includes plate 14 that defines at least two intersecting mounting channels 16a and 16b. In preferred embodiments, mounting channels 16a and 16b will be defined by knobs 25 of plate 14, which are preferably substantially symmetrically placed. In addition, mounting channels 16a and 16b will preferably be substantially perpendicularly positioned as shown, but others may prefer to position mounting channels in other positions, which is also considered to be within the scope of the present invention. Additionally, mounting channels will preferably be substantially the same length, but others may prefer to use variable lengths, which would also be within the scope of the present invention.

Cap 20 is configured to mate with MDMF 10. Preferably, cap 20 includes an underside 20a, which defines cap-channel 20b. Cap 20 also includes a top 20c. As is visible, cap 20 may mount to MDMF 10 in at least two different positions, for example, such that cap-channel 20b may correspond with either channel 16a or with channel 16b in a manner that allows engagement of a tubular material. As will be appreciated, such a configuration allows rod holder 12 to be multi-directionally mounted. As will also be appreciated, such a configuration also allows a portion of cap 20, e.g., side portion 20d, to at least partially close off at least one of the non-corresponding channels of the MDMF 10. For example, if cap 20 is mated with MDMF to correspond with channel 16a, portion 20d may at least partially close of channel 16b, for example, to prevent a tube from being mounted therein or to reduce the accumulation of dirt therein.

Fasteners 22 tightenably connect cap 20 to plate 14 of MDMF 10 in the desired position. In preferred embodiments, fasteners 22 are bolts positioned in a first set of apertures defined by cap 20. Plate 14 also will preferably define a second set of apertures 24. As is visible, the apertures of cap 20 are configured to functionally overlap with the apertures of plate 14 in at least two positions, thereby allowing multi-directional mounting. Others may prefer to fasten in other ways, all of which are considered within the scope of the present invention.

Figures 4A, 4B:
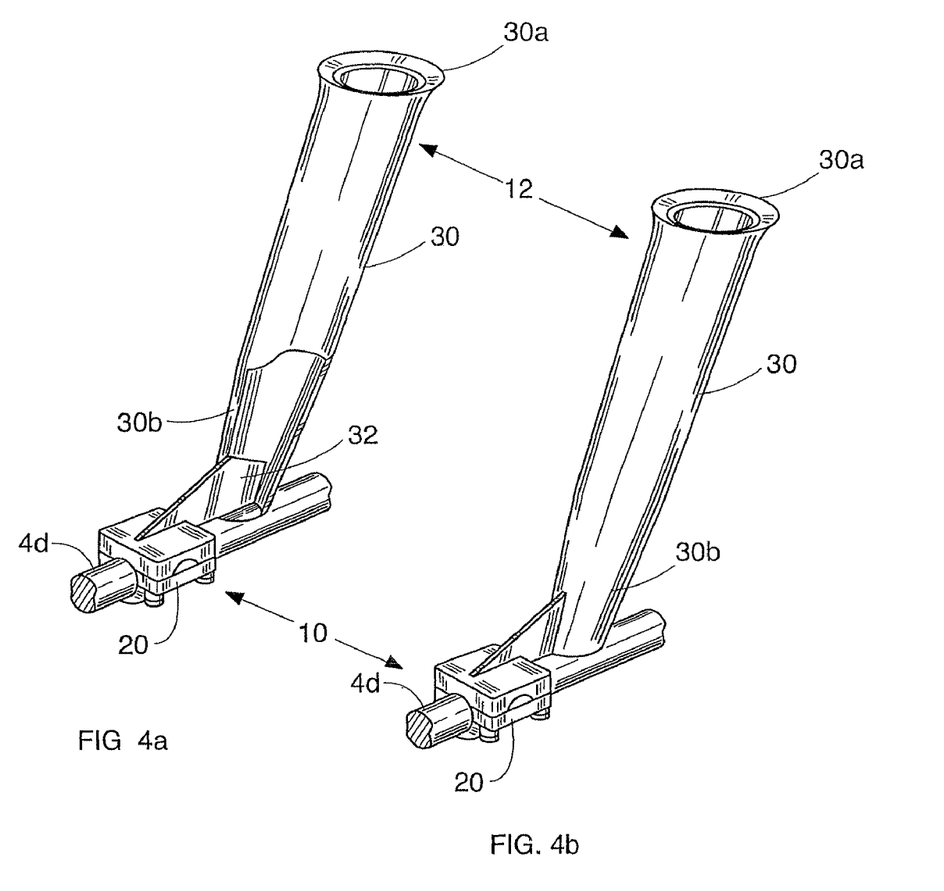
FIGS. 4a and 4b show two perspective views of a rod holder with the multi-directional mounting feature shown in FIG. 3.

FIGS. 4a and 4b show perspective views of rod holder 12, with FIG. 4a showing a partial cut away view. Referring generally to FIGS. 4a and 4b, rod holder 12 is shown mounted to a horizontal tube, which may be, for example, horizontally lengthwise tube 4d shown in FIG. 2. Rod holder 12 includes tube 30 that is sized to receive a fishing rod. Tube 30 has a first end 30a and a second end 30b. First end 30a is preferably open to allow for fishing rods to be positioned within tube 30. Stop 32 is positioned substantially distally to first end 30a. As seen, stop 32 includes a portion located within tube 30 and is preferably positioned and sized to maintain a fishing rod in a desired position. Stop 32 may also be dimensioned to accommodate the anti-rotation feature of a rod handle. A variety of stop configurations and positioning may be employed with the present invention, and in some embodiments of the invention, some may prefer not to employ stops, allowing, for example, a portion of the boat or tubular structure to which the holder is mounted to stop the rod. MDMF 10 and cap 20, previously described, are used to mount rod holder 12 to tube 4d. In this embodiment, MDMF 10 is positioned and attached toward the second end 30b of tube 30 and is attached to tube 30 in a substantially horizontal orientation, more particularly, the mounting channels are configured to be substantially horizontally oriented, as shown, when mounted to tube 4d. The depicted embodiment is useful for mounting rod holder 12 to both horizontally lengthwise and horizontally widthwise tubes.

Figures 5A, 5B:
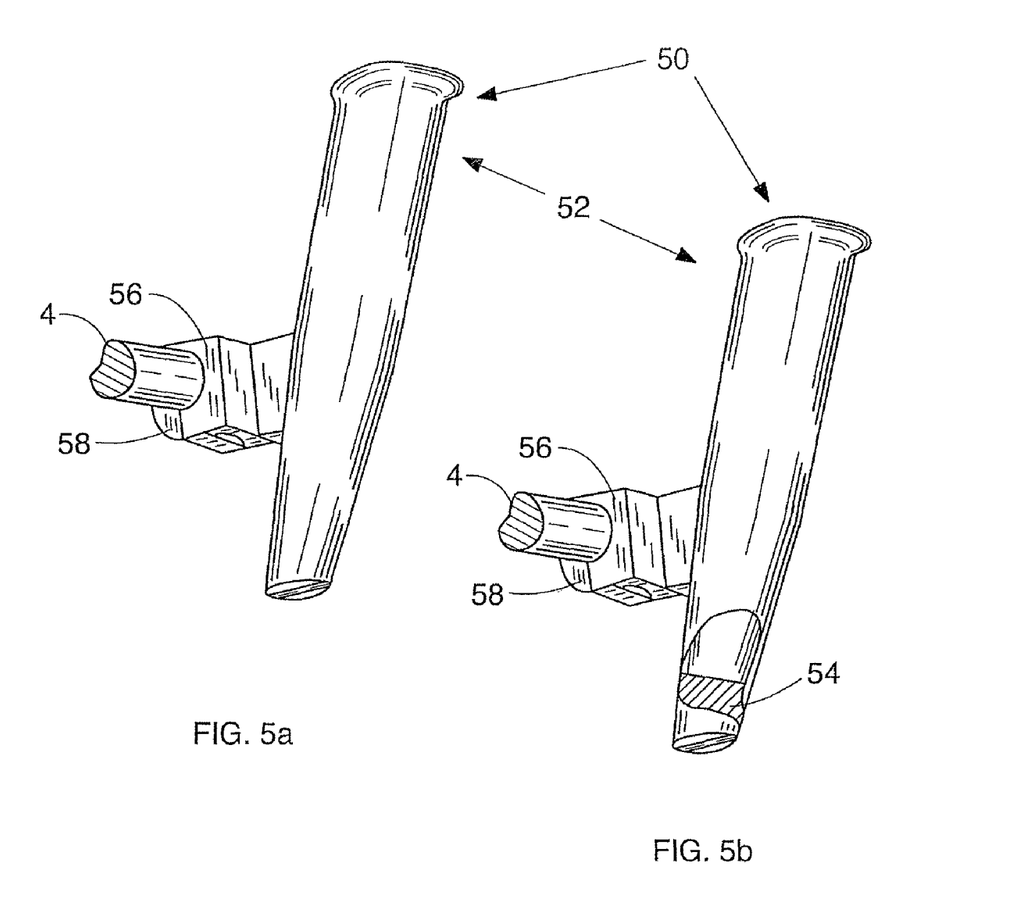
FIGS. 5a and 5b show two perspective views of another embodiment of the rod holder.

FIGS. 5a and 5b show another embodiment 50 of the present invention. This embodiment, similar to the previously described embodiment, includes tube 52, stop 54, MDMF 56 and cap 58. MDMF 56 is similar to MDMF 10; however, MDFD 56 is attached to tube 52 with a substantially vertical orientation, as shown. Those of ordinary skill in the art will appreciate that such a configuration allows rod holder 50 to be mounted to a variety of horizontally positioned tubes, e.g., tube 4 as shown, and to be mounted to substantially vertical tubes, e.g., tube 4b or 4c of FIG. 3.

In other embodiments of the present invention, MDMFs may be attached to rod holder tubes at different locations along the length of the tube or with various orientations, e.g., diagonal or to orient the tube of the rod holder diagonally. Further, some may desire to use a MDMF that can be selectively oriented, for example, and MDMF that can be attached to a rod holder tube in both a substantially horizontal or substantially vertical orientation, thereby allowing a single rod holder to be operably attached to virtually every tube of a boat (e.g., horizontally lengthwise and horizontally widthwise tubes, and substantially vertical and substantially horizontal tubes). Further, while depicted embodiments show 2 mounting channels, others may prefer additional mounting channels, e.g., 3, 4, 5, 6, 7, or 8 channels, etc. All such embodiments are considered to be within the scope of the present invention.

Figure 6A:
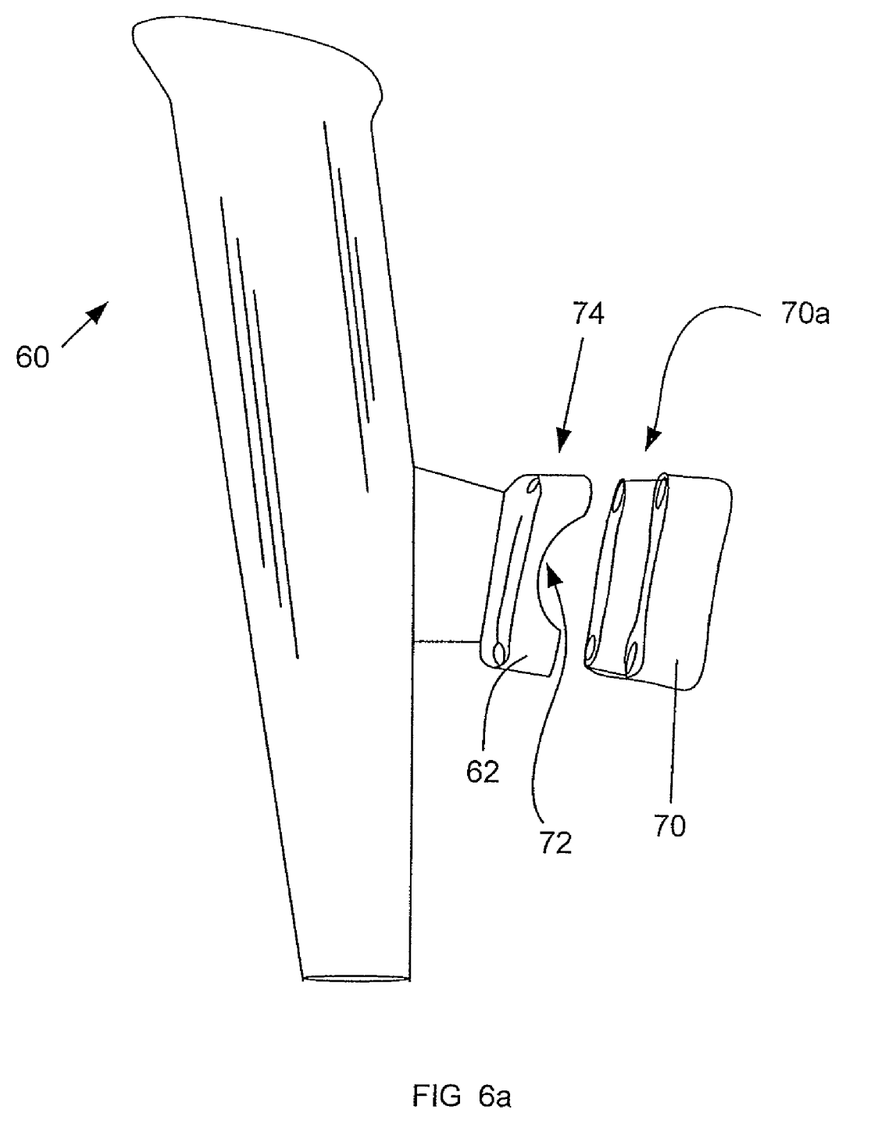
FIGS. 6a and 6b show two additional perspective views of a rod holder, similar to the embodiment shown in FIGS. 5a and 5b.
Figure 6B:
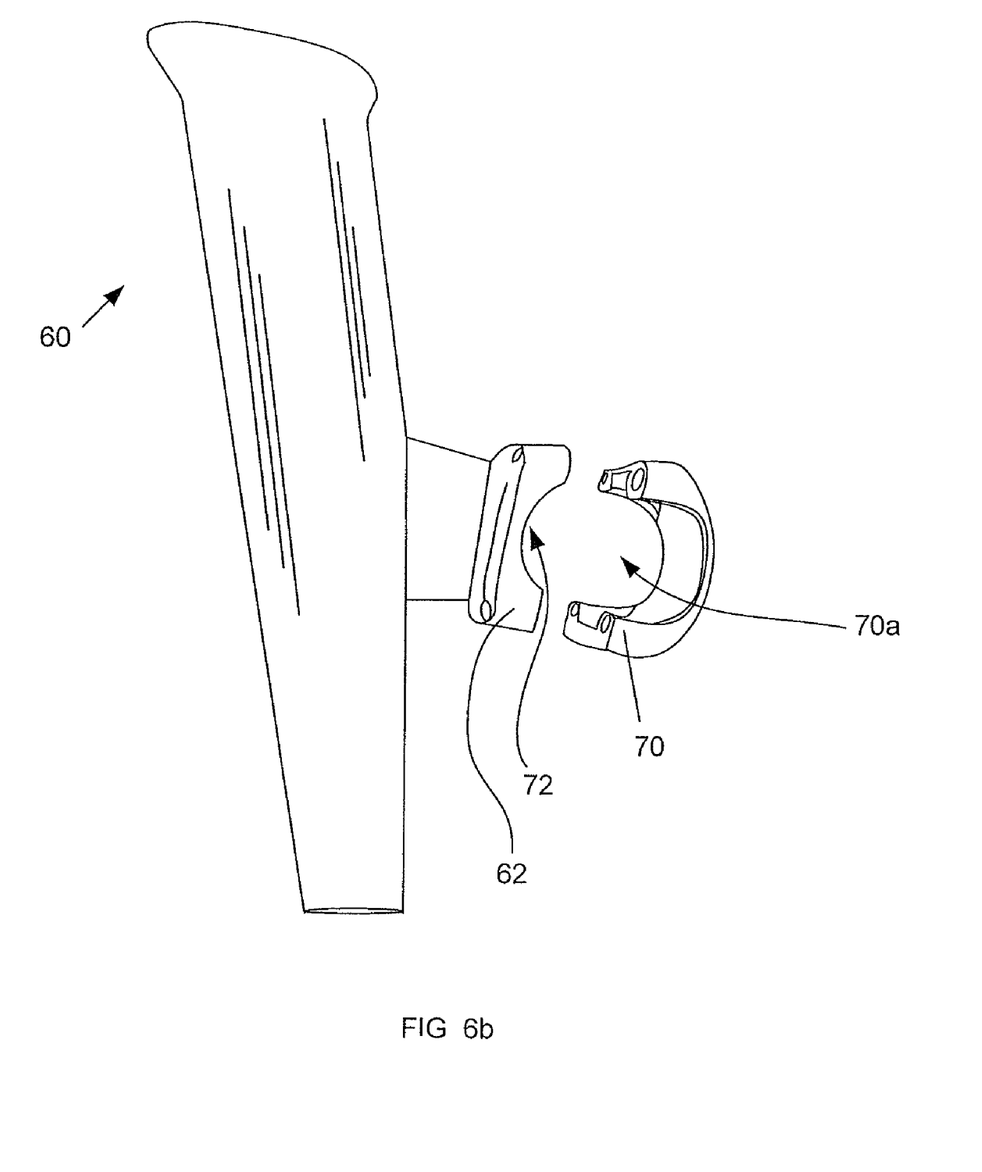

FIG. 6a shows another embodiment of a rod holder 60 of the present invention. As shown, cap 70 is oriented to mate with MDMF 62, such that through mating, rod holder 60 could be mounted to a substantially vertical tube (not shown) placed within channel 74 (not visible) of MDMF 62 and cap-channel 70a. FIG. 6b shows the same embodiment as seen in FIG. 6a, with cap 70 rotated approximately 90°. As shown, cap 70 is oriented to mate with MDMF 62, such that through mating, rod holder 60 could be mounted to a substantially horizontally positioned tube (not shown) placed through mounting channel 72 and cap-channel 70a.

Rod holders of the present disclosure may be made of a variety of materials, including steel, titanium, aluminum, nylon, polyvinyl chloride, etc. Similarly, some preferred embodiments may be integrally formed through casting, but the present disclosure is not intended to be limited by method of manufacture or type of material used. For example, in many embodiments of the present invention, e.g., lower price point embodiments, non-integral formation or plastic or nylon construction may be preferable.

Numerous characteristics and advantages have been set forth in the foregoing description, together with details of structure and function. The novel features are pointed out in the appended claims. The disclosure, however, is illustrative only, and changes may be made in detail, especially in matters of shape, size and arrangement of parts, within the principle of the invention, to the full extent indicated by the broad general meaning of the terms in which the general claims are expressed.

I claim:

1. A rod holder for holding a fishing rod and mounting to a boat's tube, said rod holder comprising:
   a rod holder tube sized to receive said fishing rod, said rod holder tube having first and second ends and being open at said first end;
   a multi-directional mounting feature attached to said rod holder tube, said multi-directional mounting feature including a plate defining at least two recessed and intersecting mounting channels; and
   a cap configured to mate with said plate in at least two different positions when rotated approximately 90°, each of which corresponds to a different one of said at least two intersecting mounting channels, wherein when mated in either position, said cap and said mounting channel define a passage configured to receive said boat's tube, thereby allowing said rod holder to be multi-directionally mounted.

2. The rod holder of claim 1, further including a fastener configured to tightenably fasten said cap to said plate of said mounting feature.

3. The rod holder of claim 1, wherein said cap defines a first set of apertures and said plate defines a second set of apertures, wherein said first and second sets of apertures are configured to overlap.

4. The rod holder of claim 3, wherein said first set of apertures and said second set of apertures are positioned to allow for attachment in at least two different positions.

5. The rod holder of claim 1, wherein said at least two mounting channels are approximately the same length.

6. The rod holder of claim 1, wherein said at least two mounting channels include at least two channels that are substantially perpendicularly positioned.

7. The rod holder of claim 1, wherein said plate of said multi-directional mounting feature is attached to said tube of said rod holder in a substantially horizontal orientation.

8. The rod holder of claim 1, wherein said plate of said multi-directional mounting feature is attached to said tube of said rod holder in a substantially vertical orientation.

9. The rod holder of claim 1, further including a stop positioned within said rod holder tube.

10. The rod holder of claim 1, wherein said cap is configured to at least partially close off at least one of said at least two mounting channels when mated with said plate.

11. A rod holder for holding a fishing rod, said rod holder comprising:
    a rod holder tube sized to receive said fishing rod, said rod holder tube having first and second ends and being open at said first end;
    a multi-directional mounting feature attached to said rod holder tube, said multi-directional mounting feature including a plate, said plate defining
       at least two recessed and substantially perpendicularly intersecting mounting channels of approximately the same length, and
       a second set of apertures; and a cap shaped to a least partially engage a substantially tubular object, wherein said cap defines a first set of apertures, and wherein said first set of apertures and said second set of apertures are positioned to allow said cap to mate with said plate in at least two different positions when rotated approximately 90°, each of which corresponds to a different one of said at least two intersecting mounting channels, wherein when mated in either position, said cap and said mounting channel define a passage configured to receive substantially tubular object.

12. The rod holder of claim 11, wherein said plate of said multi-directional mounting feature is attached to said tube of said rod holder in a substantially horizontal orientation, thereby maintaining two of said at least two intersecting mounting channels in a substantially horizontal orientation.

13. The rod holder of claim 11, wherein said plate of said multi-directional mounting feature is attached to said tube of said rod holder in a substantially vertical orientation, thereby maintaining one of said at least two intersecting mounting channels in a substantially vertical orientation and maintaining one of said at least two intersecting mounting channels in a substantially horizontal orientation.

14. The rod holder of claim 11, further including a stop positioned within said rod holder tube.

15. The rod holder of claim 11, wherein said cap is configured to at least partially close off at least one of said at least two mounting channels when mated with said plate.

\* \* \* \* \*